May 18, 1965 W. E. BAKER 3,183,720
ACTUATOR APPARATUS
Filed April 4, 1962 2 Sheets-Sheet 1
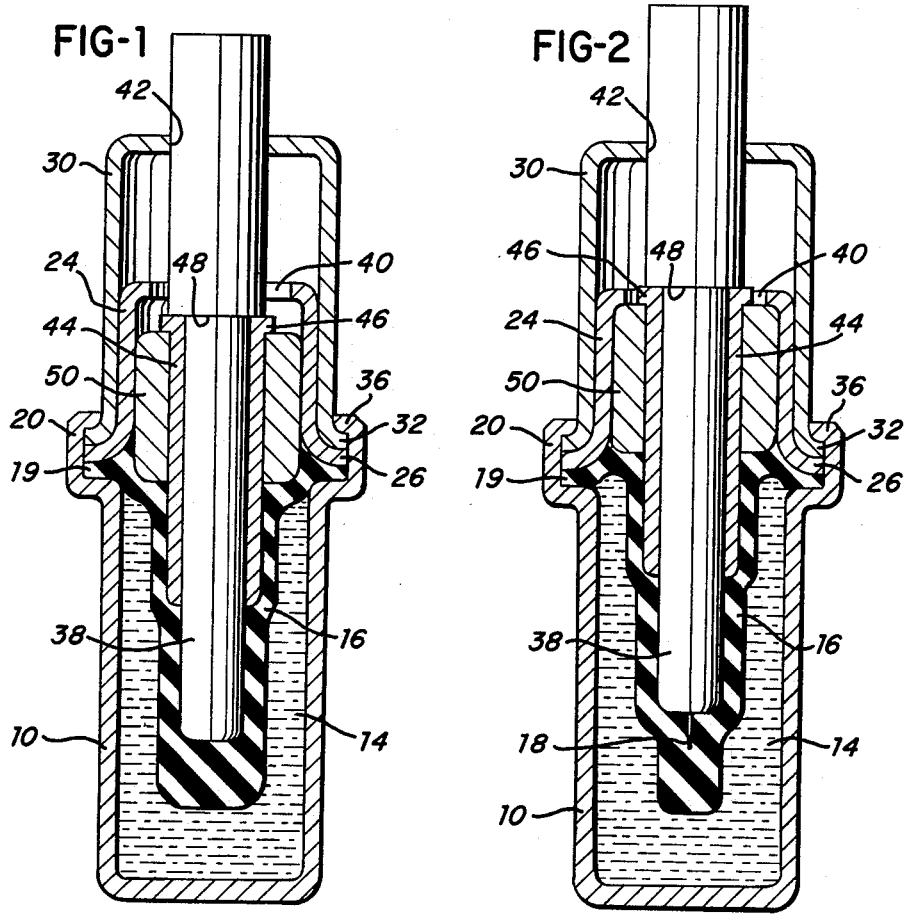
INVENTOR.
WILLIAM EDWIN BAKER
BY William R. Jacox
ATTORNEY

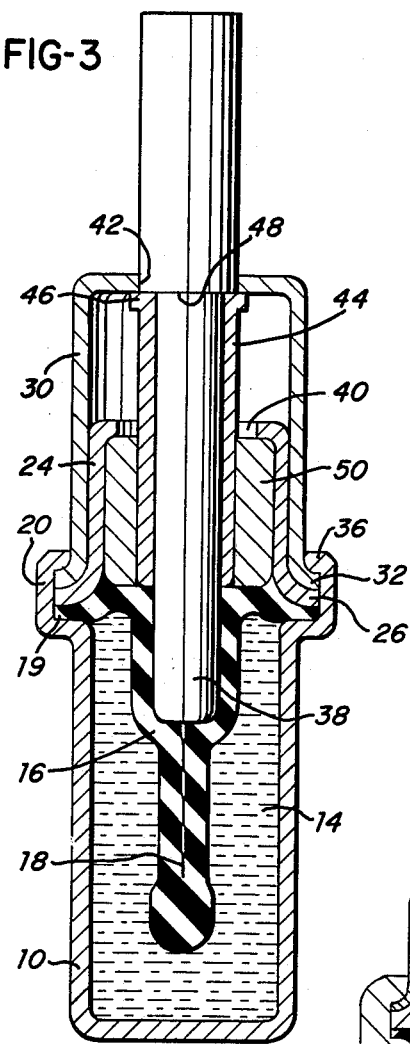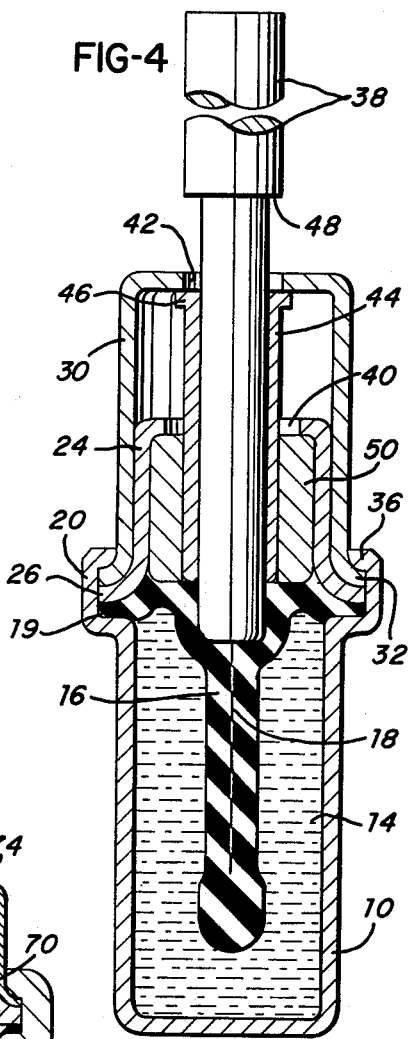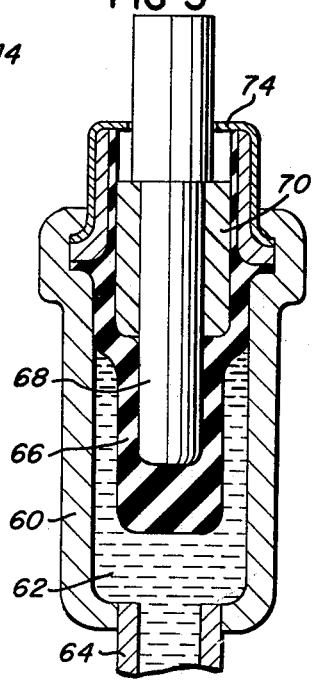

3,183,720
ACTUATOR APPARATUS
William Edwin Baker, Needham, Mass., assignor to Standard-Thomson Corporation, Waltham, Mass., a corporation of Delaware
Filed Apr. 4, 1962, Ser. No. 185,136
4 Claims. (Cl. 73—368.3)

This invention relates to actuator apparatus. The invention relates more particularly to an actuator which has linear motion.

An object of this invention is to provide a linear actuator which has a long stroke and which has the capacity to exert large forces in consideration of its physical size.

Another object of this invention is to provide a linear actuator which is capable of exerting large forces at one portion of a stroke while exerting greater movement at another portion of a stroke.

Other objects and advantages reside in the construction of parts, the combination thereof, the method of manufacture, and the mode of operation, as will become more apparent from the following description.

In the drawings:

FIGURE 1 is a sectional view of actuator apparatus of this invention.

FIGURE 2 is a sectional view, similar to FIGURE 1, but showing elements of the actuator apparatus in a position of operation.

FIGURE 3 is a sectional view, similar to FIGURES 1 and 2, but showing elements of the actuator apparatus in another position of operation.

FIGURE 4 is a sectional view, similar to FIGURES 1, 2, and 3 but showing elements of the actuator apparatus in another position of operation.

FIGURE 5 is a sectional view showing a modification of an element of the actuator apparatus of this invention.

Referring to the drawings in detail, actuator apparatus of this invention comprises a rigid container 10 within which is a quantity or body of thermal responsive expansible-contractible material 14. The material 14 may be any material or combination of materials having the desired expansion characteristics over a given temperature range.

Also within the container 10 is a body 16 of elastomeric material which is provided with a cavity or bore 18 therewithin. The elastomeric body 16 has a flange or flange portion 19 which may be secured to the container 10 in any suitable manner. Herein, the container 10 is shown as having a peripheral laterally extending portion 20 within which the flange portion 19 of the elastomeric body 16 is clamped.

An inner cup 24 has a flange 26 in engagement with the flange portion 19 of the elastomeric body 16. An outer cup 30 has a flange 32 in engagement with the flange 26 of the inner cup 24. The container 10 has a bent over portion 36 which firmly engages the flange 32 of the outer cup 30 and secures the flanges 19, 26, and 32 with respect to the container 10 and secures the flange 19 of the elastomeric body 16 in sealing engagement with the container 10.

Partially disposed within the cavity 18 of the elastomeric body 16 is an actuator rod 38 which also extends through an opening 40 in the inner cup 24 and extends through an opening 42 in the outer cup 30.

Slidably encompassing the actuator rod 38 and partially disposed within the cavity 18 of the elastomeric body 16 is a first actuator sleeve 44. The first actuator sleeve 44 has an abutment portion 46 which normally engages a shoulder 48 of the actuator rod 38. The first actuator sleeve 44 is movable through the opening 40 of the inner cup 24.

Slidably encompassing the first actuator sleeve 44 is a second actuator sleeve 50. The second actuator sleeve 50 is slidably axially movable within the inner cup 24 and is normally in engagement with the abutment portion 46 of the first actuator sleeve 44. The second actuator sleeve 50 is larger than the opening 40 in the inner cup 24 and thus, of course, is not movable therethrough.

*Operation*

When the thermal responsive material 14 is below a given temperature, the volume thereof is below a given value. Under such temperature conditions the elements of the invention appear substantially as shown in FIGURE 1. However, as heat is added to the thermally responsive material 14, causing the temperature thereof to rise above a given value, expansion of the thermally responsive material 14 occurs. Such expansion of the material 14 causes the material 14 to apply high pressures to the elastomeric body 16. The material 14 is thus a pressure producing means. Of course, the pressure of the material 14 is the same throughout all portions thereof.

The actuator members 38, 44, and 50 are all movable by forces or pressures applied thereto through the elastomeric body 16. Thus, as the initial expansion of the material 14 occurs, pressure is applied to the elastomeric body 16 causing movement of the actuator members 38, 44, and 50. It is to be noted that the actuator member 50 has a greater cross-sectional area than the actuator member 44, and the actuator member 44 has a greater cross-sectional area than the actuator member 38. Therefore, the total forces tending to move the actuator member 50 are greater than the forces tending to move the actuator member 44, and the forces tending to move the actuator member 44 are greater than the forces tending to move the actuator member 38. Thus, as expansion of the material 14 continues, all the actuator members 38, 44, and 50 are moved until the actuator member or sleeve 50 engages the inner cup 24 adjacent the opening 40 thereof, as shown in FIGURE 2.

As more heat is added to the material 14, causing additional expansion thereof, the actuator members 38 and 44 continue to be moved by pressure of the material 14 upon the elastomeric body 16. However, due to the fact that the actuator sleeve 50 is in abutting relation with the inner cup 24, the actuator sleeve 50 cannot move. Thus, there is movement of both of the actuator members 38 and 44 until the abutment portion 46 of the actuator sleeve 44 engages the end of the outer cup 30, as shown in FIGURE 3.

As further expansion of the material 14 occurs, only the actuator rod 38 can move. This is due to the fact that the actuator sleeve 50 is in engagement with the end of the inner cup 24 and the actuator sleeve 44 is in engagement with the end of the outer cup 30. Thus, with additional expansion of the material 14, the elastomeric material 16 is forced to move the actuator rod 38 to a position as shown in FIGURE 4.

Therefore, it is understood that as movement of the actuator rod 38 begins, i.e., in the movement of the actuator rod 38 from the position thereof as shown in FIGURE 1 to the position thereof as shown in FIGURE 2, large forces are applied toward movement of the actuator rod 38. This is due to the fact that all of the forces which are applied toward movement of the actuator members 44 and 50 are also applied toward movement of the actuator rod 38, because the actuator sleeve 50 abuttingly engages the abutment portion 46 of the actuator sleeve 44 and the sleeve 44 abuttingly engages the actuator rod 38. Thus, during the first stage of movement of the actuator rod 38, i.e., movement of the actuator member 38 from the position thereof shown in FIGURE 1 to the position thereof shown in FIGURE 2, there is a comparatively small amount of movement of the actuator rod 38 in consideration of the volumetric expansion of the material 14. However, during the first stage of movement of the actuator rod 38 the total forces applied toward movement thereof are very large.

Then, during the second stage of movement of the actuator rod 38, i.e., movement of the actuator rod 38 from the position thereof shown in FIGURE 2 to the position thereof shown in FIGURE 3, the amount of movement of the actuator rod 38 is greater in consideration of the volumetric expansion of the material 14. However, during the second stage of movement of the actuator rod 38, the total forces applied toward movement of the actuator rod 38 are less than the total forces applied toward movement thereof during the first stage of movement thereof.

Then, during the third stage of movement of the actuator rod 38, i.e., the movement of the actuator rod 38 from the position thereof shown in FIGURE 3 to the position thereof shown in FIGURE 4, the amount of movement of the actuator rod 38 is greater than the movement thereof during the second stage thereof. However, the total forces applied toward movement of the actuator rod 38 during the third stage of movement thereof are less than the total forces applied toward movement of the actuator rod 38 during the second stage of movement thereof.

It is to be noted that each actuator member serves as a guide member for axial movement of the actuator member which is encompassed thereby. Movement of the actuator member 50 is guided by the inner cup 24. Therefore, all movement of each of the actuator members 38, 44, and 50 is guided movement.

Therefore, the actuator rod 38 may be operatively connected to any suitable load and the actuator rod 38 is particularly adapted for movement of a load which is difficult to move during the initial stages of movement of the load. The actuator rod 38 is also adapted to move a load which requires greater movements thereof during the latter stages of movement thereof. The actuator apparatus of this invention is also adapted for use in applications which require a comparatively great amount of total movement in consideration of the physical size of the actuator.

*Apparatus of FIGURE 5*

FIGURE 5 shows actuator apparatus of this invention in which exterior forces upon a fluid material are used to move a multiple stage actuator rod.

In FIGURE 5 a container 60 is provided with fluid material 62 therein which is supplied through any suitable conduit 64. An elastomeric sealing member 66, which is similar to the elastomeric body 16 of FIGURES 1-4, is used to apply forces to an actuator rod 68 and to an actuator sleeve 70, which encompasses the actuator rod 68. The actuator members 68 and 70 are moved in a direction from the container 60 as greater pressures are applied to the material 62 through the conduit 64.

The actuator sleeve 70 is axially movable in a direction from the material 62 until the sleeve 70 engages a collar 74 which is secured to the container 60. Thus, the first stage of movement of the actuator rod 68 is with movement of the actuator sleeve 70 and the first stage of movement of the actuator rod 68 is terminated as the actuator sleeve 70 engages the collar 74. Then the second stage of movement of the actuator rod 68 occurs as increased pressures are applied to the material 62, causing greater movement of the actuator rod 68 with respect to the container 60.

Thus, the actuator apparatus of this invention includes pressure producing means by which long actuator movement is possible with large actuator forces in consideration of the physical size of the actuator apparatus.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Motor apparatus comprising:
   a fluid tight container,
   an elastomeric body within the container and having a flange portion secured thereto, the elastomeric body having a cavity therein,
   pressure applicator material within the container and exterior of the elastomeric body,
   guide means attached to the container,
   an actuator rod having a portion wtihin the cavity of the elastomeric body and extending therefrom through said guide means, the actuator rod having an abutment shoulder,
   a first actuator sleeve, the first actuator sleeve slidably encompassing the actuator rod and having a portion thereof within the cavity of the elastomeric body, the first actuator sleeve being engageable with the abutment shoulder of the actuator rod, the first actuator sleeve having a cross-sectional area greater than the cross-sectional area of the actuator rod, the first actuator sleeve also being abuttingly engageable with said guide means which thus limits movement of the first actuator sleeve,
   a second actuator sleeve, the second actuator sleeve slidably encompassing the first actuator sleeve and also being in slidable engagement with said guide means, the second actuator sleeve also being abuttingly engageable with the guide means and with the first actuator sleeve, the second actuator sleeve having a portion within the cavity of the elastomeric body and having a cross-sectional area greater than the cross-sectional area of the first actuator sleeve.

2. Apparatus according to claim 1 in which the first actuator sleeve is shorter in length than the actuator rod, and in which the second actuator sleeve is shorter in length than the first actuator sleeve.

3. Actuator mechanism comprising:
   a rigid fluid tight container,
   an elastomeric body within the container, the elastomeric body having walls forming a cavity therein,
   pressure transmission material within the container and exterior of the elastomeric body,
   a plurality of actuator members snugly disposed within the cavity of the elastomeric body, the actuator members being arranged in slidable telescopic relation within the cavity of the elastomeric body,
   increased pressure of the pressure transmission material above a given value causing inward movement of the walls which form the cavity of the elastomeric body, thus causing movement of the actuator members in a direction from the elastomeric body and in a direction from the container.

4. Motor apparatus comprising:
   a container having a given length,
   pressure applicator means within the container,
   a plurality of actuator members each of which has at least a portion thereof within the container coaxial with the longitudinal axis thereof, each of the actuator members having a cross-sectional area different from the cross-sectional area of any other actuator member, each of the actuator members having a length different from the length of any other actuator member, the actuator member having the greatest cross-sectional area also having the shortest length and the actuator member which has the next greatest cross-sectional area having the next shortest length,
   each of the actuator members being movable with respect to the container by pressure applied by the pressure applicator means within the container.

References Cited by the Examiner

UNITED STATES PATENTS

| | | | | |
|---|---|---|---|---|
| 2,208,149 | 7/40 | Vernet | | 137—789 |
| 2,433,221 | 12/47 | Huber | | 137—157 |
| 2,873,609 | 2/59 | Von Wangenheim | | 73—368.3 |
| 3,016,747 | 1/62 | Vernet | | 73—368.3 |

ISAAC LISANN, *Primary Examiner.*

L. R. PRINCE, *Examiner.*